July 12, 1932.  E. HOROWICZ  1,867,406
FAULT RESPONSIVE APPARATUS
Original Filed April 5, 1930
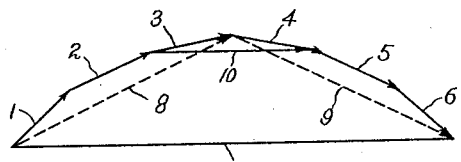
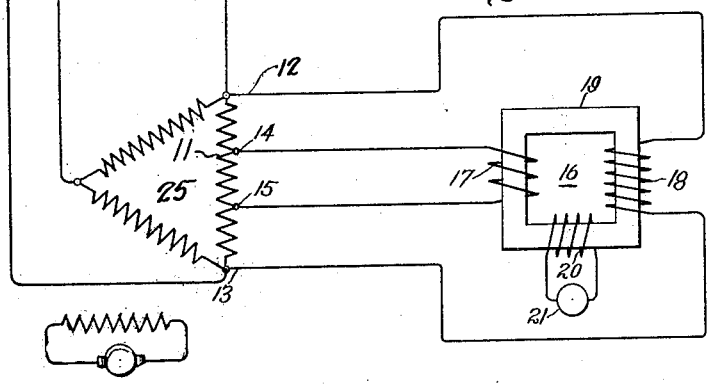
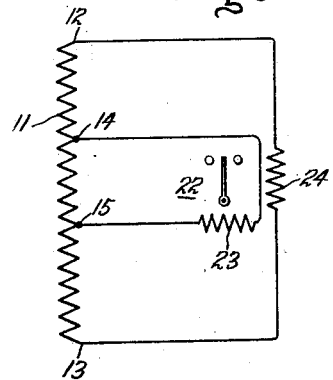
Inventor:
Eugen Horowicz,
by Charles E. Tullar
His Attorney.

Patented July 12, 1932

1,867,406

UNITED STATES PATENT OFFICE

EUGEN HOROWICZ, OF CHARLOTTENBURG, GERMANY, ASSIGNOR TO GENERAL ELECTRIC COMPANY, A CORPORATION OF NEW YORK

FAULT RESPONSIVE APPARATUS

Application filed April 5, 1930, Serial No. 441,985, and in Germany April 24, 1929. Renewed February 6, 1932.

My invention relates to improvements in fault responsive apparatus and more particularly to improvements in apparatus responsive to abnormal conditions in the windings of dynamoelectric machines and an object of my invention is to provide improved electroresponsive means for determining the existence of abnormal conditions such as faults between turns of the windings whereby to insure great sensitivity with relatively simple means.

My invention will be better understood from the following description when considered in connection with the accompanying drawing and its scope will be pointed out in the appended claims.

In the accompanying drawing, Fig. 1 is a vector diagram explanatory of my invention and Figs. 2 and 3 represent diagrammatically embodiments of my invention.

In connection with dynamoelectric machines and apparatus in which the voltage is produced by a rotating field and in which the winding is arranged in spaced slots, the total voltage is composed of a number of individual voltages which are associated with the different coil groups. The part voltages in this case are not in phase with one another but are generally displaced relatively to each other by a predetermined angle which is the same for all, as represented in the vector diagram of Fig. 1. In this figure the individual part voltages are indicated by 1 to 6 respectively. The resultant phase or total voltage 7 is smaller than the arithmetical sum of the individual voltages. If the middle of the winding is selected as a tapping point then the two part voltages 8 and 9 are likewise not in phase with each other.

If in any fault responsive apparatus, the phase relation is not used but the value of the voltages only is employed, then two relays, each of which is energized by the voltages to be compared and whose armatures engage with a common balance beam, lever or the like, suffice for the control. This arrangement, however, possesses but relatively slight sensitivity. If not only the value of the voltage, but also, for the purpose of increasing the sensitivity, its phase relation is also used for protection against abnormal conditions of the winding, the comparison devices must be calibrated to the phase displacement for each individual case so that they become relatively complicated.

According to my invention, the determination of faulty conditions can be effected quite simply by the feature that as comparison voltages such voltages are selected as are of like phase in normal or undisturbed operation. According to Fig. 1, for example, the phase voltage 7 and the part voltage 10 of like phase, which is composed of the individual voltages 3 and 4, can be used for the comparison.

Referring now to the embodiment of my invention shown in Fig. 2, the winding 11 indicates one phase of the polyphase winding of an alternating current dynamoelectric machine 25. This winding is, of course, subject to voltages differing in phase in different parts of the winding as shown in Fig. 1. By the expression "parts of the winding" I mean to include not only a fraction thereof but also the whole of the winding. Between the end points or terminals 12 and 13 the phase voltage which corresponds to the vector 7 of Fig. 1 prevails. The winding is tapped at the points 14 and 15 between which a voltage exists corresponding, for example, to the vector 10 of Fig. 1. This voltage is in normal operation of like phase with the phase voltage 7.

In accordance with my invention, these like phase voltages are applied to electroresponsive means including cooperating coils respectively connected to be energized in accordance with these voltages. For example, in Fig. 1 the two voltages 7 and 10 are supplied to a transformer 16 whose windings or coils 17 and 18 are so constructed with respect to the number of turns in the connections that in normal operation substantially no flux is present in the iron core 19. The transformer has a further winding 20 of any desired number of turns to which is connected an indicating or protective device 21, or both.

In normal operation the winding 20 is not energized. If, however, a fault, such as a winding contact or short circuit between turns occurs on the machine winding 11 to be protected, then the voltage ratio or the mutual phase position, or both, change in the case of the voltages impressed on the windings 17 and 18, so that a resulting field occurs in the transformer core 19. This induces a voltage in the winding 20 which causes the connected apparatus 21 to respond. This apparatus may be a relay arranged to control circuit interrupters or the like in the machine circuit in a manner well known to the art.

In some cases it may be desirable to give special consideration to the higher harmonics which may exist in the voltages to be compared. The components of these harmonics in the individual voltages 1 to 6 may represent a relatively larger part than in the total voltage 7. The winding factor used in the machine design affords a measure of these harmonics as is well known to the art. In the transformer 16 a flux produced by the unbalanced higher harmonics would tend to arise and might cause the apparatus 21 to respond even in normal operation.

In order to avoid this, I may use, in place of the transformer with the current operated device 21, another device or relay 22. As shown schematically in Fig. 3, this relay is of the induction wattmetric type and includes two cooperating coils 23 and 24 one of which may be fixed and the other movable as in the case of induction dynamometer devices. One of these coils, such as 24, is connected to be energized in accordance with the voltage 7 across the whole of the winding 11 and the other coil 23 in accordance with the voltage 10 of like phase across a part of the winding 14, 15. If in the individual or part voltage 10, there are harmonics of definite frequency which do not appear in the phase voltage 7 on account of the vectorial addition, then no reaction occurs in the device 22 by reason of these harmonics since in such a wattmetric system only currents of like frequency can produce a torque.

With the embodiment of my invention shown in Fig. 3, it will be obvious that in normal operation, that is when the voltages 7 and 10 are in phase, the torque of the windings 23 and 24 will be substantially zero and there will be no tendency to move the contact controlling member of the relay 22. However, on the occurrence of a fault between turns of the winding 11, the phase relation between the voltages 7 and 10 will be changed and the windings 23, 24 will cooperate to produce a torque tending to move the contact controlling member to contacting position.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with an alternating current dynamoelectric machine having a winding in which occur voltages differing in phase in different parts of the winding, means operative in response to abnormal conditions of said winding including a plurality of cooperating coils respectively connected to be energized in accordance with the voltages across different parts of said winding normally having voltages alike in phase.

2. In combination with an alternating current dynamoelectric machine having a winding in which occur voltages differing in phase in different parts of the winding, means operative in response to abornmal conditions of said winding including two cooperating coils, one connected to be energized in accordance with the voltage across the whole of said winding and the other connected to be energized in accordance with the voltage across a part of said winding normally having its voltage in phase with the voltage across the whole of the winding.

3. In combination with an alternating current dynamoelectric machine having a winding in which occur voltages differing in phase in different parts of the winding, means operative on the occurrence of a fault between turns of said winding including two cooperating coils respectively connected to be energized in accordance with the voltages across different parts of said winding normally having voltages alike in phase.

4. In combination with an alternating current dynamoelectric machine having a winding in which occur voltages differing in phase in different parts of the winding, relay means operative on the occurrence of a fault between turns of said winding, including two cooperating coils respectively connected across a whole of said winding and a part of said winding normally having its voltage in phase with the voltage across the whole of the winding.

5. In combination with an alternating current dynamoelectric machine having a winding in which occur voltages differing in phase in different parts of the winding, means operative on the occurrence of a fault between turns of said winding including an induction relay having two cooperating coils, one of said coils being connected to be energized in accordance with the voltage across the whole of said winding and the other coil being connected to be energized in accordance with the voltage across part of said winding normally having its voltage in phase with the voltage across the whole of the winding.

In witness whereof, I have hereunto set my hand this 11th day of March, 1930.

EUGEN HOROWICZ.